Feb. 10, 1959 W. F. BEDINGFIELD 2,872,970
TIRE BEAD BREAKING TOOL
Filed June 1, 1956

William F. Bedingfield
INVENTOR.

United States Patent Office 2,872,970
Patented Feb. 10, 1959

2,872,970

TIRE BEAD BREAKING TOOL

William F. Bedingfield, Jennings, Okla.

Application June 1, 1956, Serial No. 588,689

1 Claim. (Cl. 157—1.17)

The present invention relates to new and useful improvements in tire tools and has for its primary object to provide, in a manner as hereinafter set forth, a hand operated device of this character comprising novel means for expeditiously, safely and with a minimum of effort, breaking tires away from the rims without damaging the beads thereof in any way, a particularly important consideration when removing tires of the tubeless type.

Another very important object of the invention is to provide a single combination tool of the character described which is adapted to be used for breaking the beads away from the rims, removing the tires from the wheels and for removing hub caps.

Still another important object of the invention is to provide a tire tool of the aforementioned character which may be readily adjusted for use on various types and sizes of wheels and tires.

Other objects of the invention are to provide a tire tool of the character set forth which will be comparatively simple in construction, strong, durable, compact, of light weight, highly efficient and reliable in use and which may be manufactured at low cost.

Figure 1:
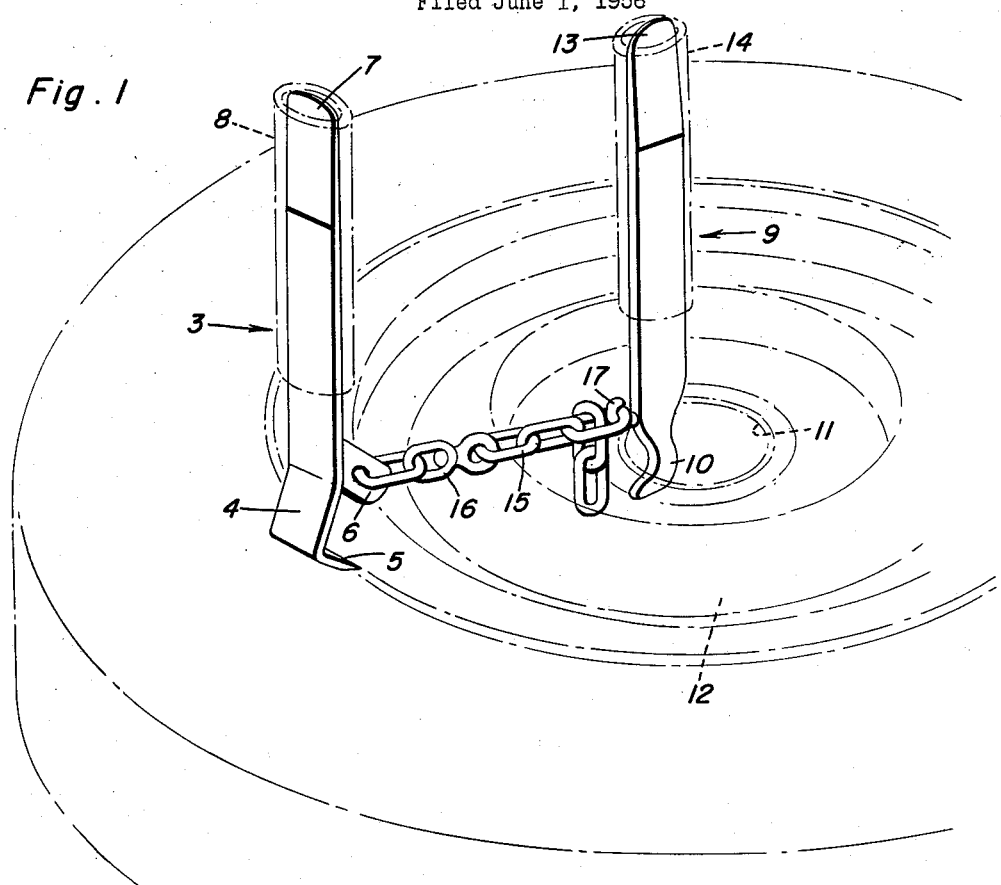
Figure 2:
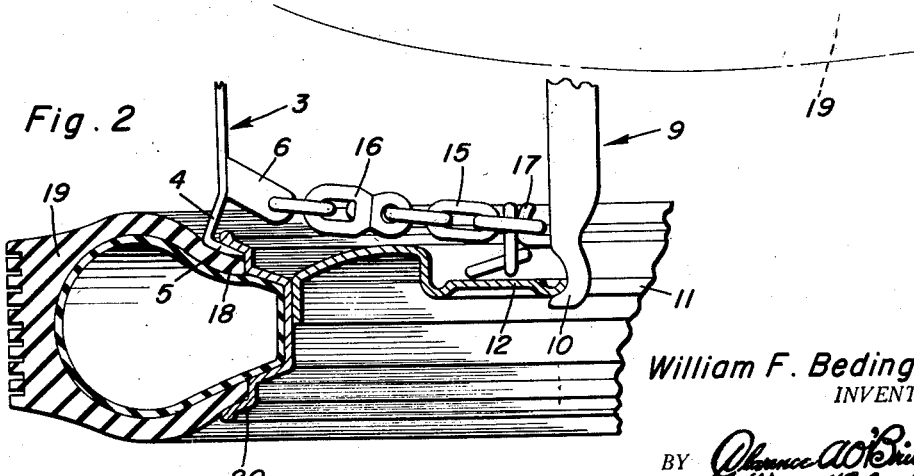

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view, showing a tire tool constructed in accordance with the present invention in use; and, Figure 2 is a vertical sectional view through a portion of a wheel and tire, showing a tool embodying the present invention in use thereon.

Referring now to the drawing in detail, it will be seen that the embodiment of the invention which has been illustrated comprises a breaker bar which is designated generally by reference character 3. The breaker bar 3 may be of any suitable metal. The bar 3, which may also be of any desired dimensions, is provided with a rearwardly obtusely bent lower end portion 4 terminating in a reversely bent breaker blade 5. Fixed on the lower portion of the bar 3 is a forwardly and downwardly inclined apertured arm 6. The other end portion of the bar 3 is formed to provide a tire iron and hub cap tool 7. If desired, a removable rubber grip 8 may be provided on the breaker bar 3.

Reference character 9 designates generally a pulling lever of suitable metal. The pulling lever 9, which may also be of any desired dimensions, terminates at its lower end in an anchoring hook 10 which is engageable in the usual central opening 11 of a conventional wheel 12. The upper end portion of the pulling lever 9 is also formed to provide a tire iron and hub cap tool 13. Reference character 14 designates, in broken lines, a removable grip which may be provided on the pulling lever 9 for added comfort and convenience.

A chain 15, comprising a swivel 16, has one end permanently connected to the apertured arm 6 of the breaker bar 3. The other end portion of the chain 15 is adjustably engageable in a hook 17 on the lower portion of the lever 9 for adjustably connecting said lever to the breaker bar 3.

It is thought that the use of the tool will be readily apparent from a consideration of the foregoing. Briefly, to break the usual beads 18 of a pneumatic tire 19 away from the sides of a rim 20, said tire is placed horizontally on a suitable supporting surface. The breaker blade 5 of the bar 3 is positioned between the upper edge of the rim and the tire, the hook 10 of the pulling lever 9 is engaged in the central opening 11 of the wheel 12 and the chain 15 is engaged in the hook 10 at the correct length or adjustment, thus operatively connecting said lever 9 to said bar 3. With one hand, the bar 3 is held with the breaker blade 5 pointed directly between the rim and the bead of the tire. With the other hand, the lever 9 is then swung from left to right as viewed in Figure 2 of the drawing for forcing the blade 5 to enter between the rim and the tire bead. The construction and arrangement of parts is such that the bar 3 does not pivot or swing and said bar is so held that the blade 5 is pointed at all times straight between the rim and the tire bead. While maintaining sufficient pressure on the lever 9, the bar 3 is then swung downwardly from right to left as viewed in Figure 2 of the drawing for breaking the bead 18 away from the rim in an obvious manner, said bar fulcruming or swinging on the rim. The bar 3 is then swung upwardly and slipped around the side of the rim from which the bead has been broken and the foregoing operation is repeated. After one side of the tire has thus been freed, said tire is turned over and the other side is broken from the rim. The members 3 and 9 may then be reversed and used as tire irons for completely removing the tire from the wheel.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be restored to, falling within the scope of the invention as claimed.

What is claimed as new is as follows:

A tool for breaking a tire bead from a flanged rim of a wheel having a central opening therein, said tool comprising, in combination, a flat metallic bar of a uniform width throughout its length, said bar including an obtusely rearwardly angled lower end portion terminating in a reversely bent blade engageable on the tire for introduction between the bead thereof and the rim flange, a forwardly projecting apertured arm on the bar immediately adjacent said rearwardly angled lower end portion thereof, a chain having one end connected to the arm, said chain including a swivel at an intermediate point, a hand lever including a hook on its lower end engageable in the opening for swingably anchoring said lever to the wheel, and a second hook on the lever adjacent the first named hook and engageable selectively with the chain links of the other end portion of the chain for adjustably and detachably connecting said lever to the lower end portion of the bar for pulling the blade between the bead and the flange when the lever is swung away from the bar and said bar is held against swinging movement, the juncture of said blade with said rearwardly angled lower end portion of the bar providing a fulcrum for said bar operable on the tire upon rearward swinging movement of the bar for separating the bead from the flange after the blade is inserted therebetween.

References Cited in the file of this patent

UNITED STATES PATENTS

| | | |
|---|---|---|
| 2,148,111 | Dennis | Feb. 21, 1939 |
| 2,241,886 | Pearce et al. | May 13, 1941 |
| 2,293,467 | Kenworthy | Aug. 18, 1942 |
| 2,305,886 | Mahler | Dec. 22, 1942 |
| 2,563,987 | Colley | Aug. 14, 1951 |
| 2,660,229 | Taylor | Nov. 24, 1953 |
| 2,684,112 | Coats | July 20, 1954 |
| 2,771,941 | Manupello | Nov. 27, 1956 |
| 2,775,289 | Anderson | Dec. 25, 1956 |